US012773856B2

United States Patent

(12) Senoura

(10) Patent No.: US 12,773,856 B2
(45) Date of Patent: Oct. 27, 2026

(54) PRINTING CONTROL APPARATUS, CONTROL METHOD, AND STORAGE MEDIUM

(71) Applicant: CANON KABUSHIKI KAISHA, Tokyo (JP)

(72) Inventor: Kanta Senoura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 140 days.

(21) Appl. No.: 18/785,319

(22) Filed: Jul. 26, 2024

(65) Prior Publication Data

US 2025/0042181 A1 Feb. 6, 2025

(30) Foreign Application Priority Data

Aug. 3, 2023 (JP) ................................ 2023-126829

(51) Int. Cl.

*B41J 11/00* (2006.01)
*B41J 2/045* (2006.01)
*B41J 29/393* (2006.01)
*B41J 2/01* (2006.01)

(52) U.S. Cl.

CPC ......... *B41J 11/002* (2013.01); *B41J 2/04551* (2013.01); *B41J 29/393* (2013.01); *B41J 2/01* (2013.01)

(58) Field of Classification Search

CPC .... B41J 11/002; B41J 2/04551; B41J 29/393; B41J 2/01

See application file for complete search history.

(56) References Cited

U.S. PATENT DOCUMENTS

2006/0092459 A1* 5/2006 Kimura ................ B65H 37/007 358/1.15

FOREIGN PATENT DOCUMENTS

JP 2007105927 A * 4/2007 ................ B41J 2/01

* cited by examiner

*Primary Examiner* — Yaovi M Ameh
(74) *Attorney, Agent, or Firm* — VENABLE LLP

(57) ABSTRACT

A printing control apparatus includes an illumination to irradiate light on an area where a print head performs printing onto a print medium and controls switching of the illumination between a lighting state and a lighting off state according to a particular user operation performed on a particular display item during printing performed by the print head. A display control unit controls to display the particular display item in a state where the particular user operation can be accepted during the printing, wherein the display control unit controls to change the display form or the presence or absence of the display of the particular display item according to whether or not it is a state where the particular user operation can be accepted.

15 Claims, 14 Drawing Sheets

| SETTING | DURING STANDBY | COVER OPENED | | COVER CLOSED | DURING PRINTING | | AT THE COMPLETION OF PRINTING | DURING ADJUSTMENT | | AFTER ADJUSTMENT | DURING ERROR |
|---|---|---|---|---|---|---|---|---|---|---|---|
| AUTOMATIC | TURN OFF LIGHTING | TURN ON LIGHTING | ⇄ | TURN OFF LIGHTING | TURN ON LIGHTING | ⇄ | TURN OFF LIGHTING | TURN OFF LIGHTING | → | TURN OFF LIGHTING | TURN OFF LIGHTING |
| ON | TURN ON LIGHTING | TURN ON LIGHTING | ⇄ | TURN ON LIGHTING | TURN ON LIGHTING | → | TURN ON LIGHTING | TURN OFF LIGHTING | → | TURN ON LIGHTING | TURN OFF LIGHTING |
| OFF | TURN OFF LIGHTING | TURN OFF LIGHTING | ⇄ | TURN OFF LIGHTING | TURN OFF LIGHTING | → | TURN OFF LIGHTING | TURN OFF LIGHTING | → | TURN OFF LIGHTING | TURN OFF LIGHTING |

FIG.14

PRINTING CONTROL APPARATUS, CONTROL METHOD, AND STORAGE MEDIUM

BACKGROUND OF THE INVENTION

Field of the Invention

The present disclosure relates to a technology for illuminating a printing area.

Description of the Related Art

In a printing apparatus, there exists a configuration to make it possible, during a printing operation in a state where the cover is closed, to externally observe the condition of image printing being performed on a print medium by a print head inside the printing apparatus. A transmission window for viewing the condition inside the cover and an interior illumination for illuminating the printing unit are known as a method to implement such a configuration inexpensively.

In Japanese Patent Laid-Open No. 2007-105927 (Patent Document 1), it is proposed to enable the user, during a printing operation in a state where the cover is closed, to view the printing portion irradiated by an LED via a translucent window formed in the upper cover of the printing apparatus, so that the user can easily observe the condition of the printing being performed. Further, the Patent Document 1 discloses that the LED is made to light up or not based on a user operation prior to the printing operation.

In the printing apparatus disclosed in the Patent Document 1, it is not possible to switch whether or not to turn on the LED lighting up the printing portion according to an instruction from the user during a printing operation.

SUMMARY OF THE INVENTION

A printing control apparatus according to an embodiment of the present disclosure includes: an illumination configured to irradiate light on an area where a print head performs printing onto a print medium; and at least one memory and at least one processor which function as a control unit configured to control switching of the illumination between a lighting state and a lighting off state according to a particular user operation during printing performed by the print head.

Further features of the present invention will become apparent from the following description of exemplary embodiments with reference to the attached drawings.

BRIEF DESCRIPTION OF THE DRAWINGS

FIG. 14 is a diagram illustrating an example of the interior illumination control.

DESCRIPTION OF THE EMBODIMENTS

Hereinafter, a detailed explanation is given of preferable embodiments of the present disclosure with reference to the accompanying drawings. Note that the relative arrangement of each constituent element of the apparatus used in the following embodiments, as well as the shape of the apparatus, etc., are merely examples, and there are no imitation as such. Further, every combination of the characteristics explained in the following embodiments is not necessarily essential to the solution provided by the present disclosure. Moreover, in the accompanying drawings, the same or similar configurations are marked with the same reference numbers, so that overlapping explanations are omitted.

There are cases where a user wants to switch the illumination state during printing, such as a case where a user of a printing apparatus transmits print data remotely from a location away from the printing apparatus using an information processing device such as a computer, and later wants to check the printing status as the user comes to the front of the printing apparatus, or a case where the user wants to turn off the illumination after confirming the printing status. Especially in use cases where a single printing apparatus is used by multiple users, there may be various needs regarding the illumination state of the printing apparatus. For example, there may be users who want the illumination to be always off from an energy conservation perspective, users who want the illumination to turn on automatically during printing without having to give lighting instructions, or users who prefer the illumination to remain on always because switching the illumination is troublesome. Before printing starts, the user is not aware of what the illumination state will be during printing, so there may be cases where the user wants to change the illumination state after the printing has started. Therefore, in the present embodiment, an explanation is given with an example of controlling to switch the illumination state of the internal illumination of the printing apparatus according to a user instruction during printing.

Figure 1:
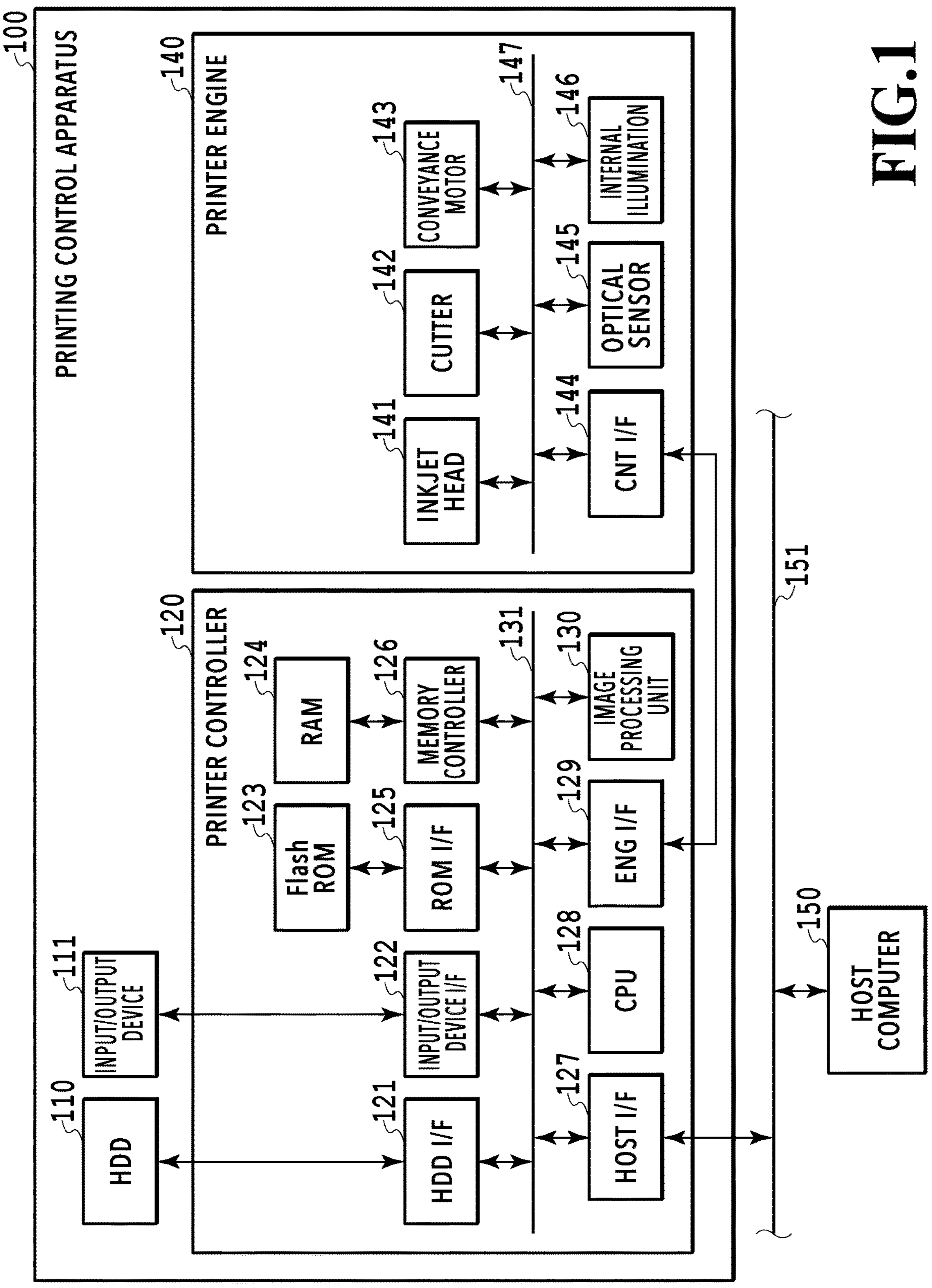
FIG. 1 is a diagram illustrating an example of a configuration of the printing control apparatus.

FIG. 1 is a schematic view illustrating an example of the internal configuration of the printing control apparatus according to the present embodiment. With reference to FIG. 1, an explanation is hereinafter given about the configuration of the printing control apparatus. Note that, in the present embodiment, although an explanation is given where the printing control apparatus is an apparatus with a printing function as an example, there is no limitation as such. For example, the printing control apparatus may be an apparatus that is further equipped with a reading unit for reading images on the original document and functions as a copy machine, or a multifunction peripheral (MFP) with other functions added.

In FIG. 1, the printing control apparatus (the printing apparatus) 100 includes the printer controller 120, the printer engine 140, the HDD (hard disk drive) 110, and the input/output device 111. Further, the printing control apparatus 100 can be connected to the host computer 150 via the network 151. The printer controller 120 includes the HDD interface (I/F) 121, the input/output device I/F 122, the ROM (read only memory) I/F 125, and the memory controller 126. The printer controller 120 includes the host I/F 127, the CPU (central processing unit) 128, the ENG I/F 129, and the image processing unit 130. These are connected via the system bus 131. In addition, the printer controller 120 includes the flash ROM 123 and the RAM (random access memory) 124. The flash ROM 123 and the RAM 124 are connected to the system bus 132 via the ROM I/F 125 and the memory controller 126, respectively.

The CPU 128 is a central arithmetic processing unit in a form of a microprocessor (a microcomputer), which controls overall operation of the printing control apparatus 100 by executing a program and activating hardware. The flash ROM 123 stores a program to be executed by the CPU 128, image data, and various data necessary for various operations of the printing control apparatus 100. The RAM 124 is used as a work area for the CPU 128 and a temporary storage area for various received data. The image processing unit 130 performs various image processing. For example, the image processing unit 130 performs processing to rasterize (convert) print data (for example, data represented in page description language) handled by the printing control apparatus 100 into image data (bitmap image data) and other image processing. Further, the image processing unit 130 converts the color space (for example, YCbCr) of the image data included in the input print data to a normal RGB color space (for example, sRGB). Furthermore, the image processing unit 130 carries out various image processing on the image data as needed, such as resolution conversion to a valid (possible for print processing by the printing control apparatus 100) pixel count, image analysis, and image correction. The image data acquired from these kinds of image processing is stored in the RAM 124 or the HDD 110.

The printer engine 140 is a printing unit that performs image formation. The printer engine 140 includes the inkjet head 141, the cutter 142, the conveyance motor 143, the CNT I/F 144 that interfaces with the printer controller 120, the optical sensor 145, and the internal illumination 146. Each component is connected via the system bus 147.

The inkjet head 141 is the printing unit that performs printing of images and prints images on a print medium based on image data. The inkjet head 141, for example, holds multiple print heads for multiple colors, and the ink is ejected from the print heads to form images on the print medium in synchronization with the conveyance of the print medium. Note that the present embodiment will describe an example in which the printing control apparatus 100 is an inkjet type printer that uses ink as the print material. However, the present disclosure is not limited to this example. The printing control apparatus 100 of the present embodiment can be applied to a printing control apparatus of an electrophotographic method and various printing methods such as a thermal printer (a sublimation type, a thermal transfer type, etc.), a dot impact printer, an LED printer, a laser printer, etc.

The cutter 142 is a mechanism that cuts the roll sheet used as the print medium in the present embodiment. The cutter 142 cuts the rolled paper into a predetermined length after image printing. The conveyance motor 143 is a motor for driving the conveyance rollers that convey the roll sheet, and is controlled by the CPU 128. The optical sensor 145 is a measurement unit for measuring attribute values of the print medium, and is a reflective optical sensor configured with an LED (light emitting diode) as a light-emitting element, a specular reflected light receiving element, a diffusion light receiving element, and the like. The printing control apparatus 100 uses the optical sensor 145 to measure the strength of the specular reflected light and diffusion reflected light of the sheet on the platen 205, as well as attribute values such as the thickness of the sheet.

The internal illumination 146 is an LED that lights up the platen 205 during printing, cleaning inside the cover, or during work with the cover opened, such as a case of replacing the inkjet head 141 and the cutter 142. The internal illumination 146 is controlled by the CPU 128 based on the state of the printing control apparatus 100 and the settings designated by the user. The input/output device 111 includes a hard key and an operation panel for the user to perform various operations, as well as a display unit for displaying (notifying) various information to the user. The input/output device 111 performs display control processing for controlling the CPU 128 to display the status of the printing control apparatus 100, messages, and the like. Further, instead of such displaying, the input/output device 111 may output sound (a buzzer, a voice, etc.) based on acoustic information from the sound generator to notify the user of various information. During sheet feeding, the user uses the input/output device 111 to perform selection of the sheet type and do the setting for the correct sheet type in the printing control apparatus 100, so that the printing control apparatus 100 can perform the conveyance that is set for each sheet type.

The HDD 110 is a nonvolatile storage area that can store and read the programs for execution by the CPU 128, the print data, and the setting information necessary for various operations of the printing control apparatus 100. Note that other large capacity storage devices, such as a flash memory, may be used instead of the HDD 110. Note that, in the present embodiment, the input/output device 111 is internally present in the printing control apparatus 100, but there is no limitation as such, and the input/output device 111 may be connected as an external configuration via the network 151, for example. Further, the host computer 150 may also serve as the input/output device 111. Furthermore, in addition to the input/output device 111, the printing control apparatus 100 may be further connectable to other input/output devices via the network 151 or the like. The host computer 150, for example, is an external device that serves as a supple source of the print data and has a printer driver installed. Instead of the host computer 150, the printing control apparatus 100 may be equipped with, for example, a data-providing device, such as a reader for reading images, a digital camera, or a smart phone, that serves as a supply source of the print data. The form of the connection between each device and the printing control apparatus 100 is not limited to connection via the network 151, but may be, for example, directly connected through wireless communication.

Figure 2:
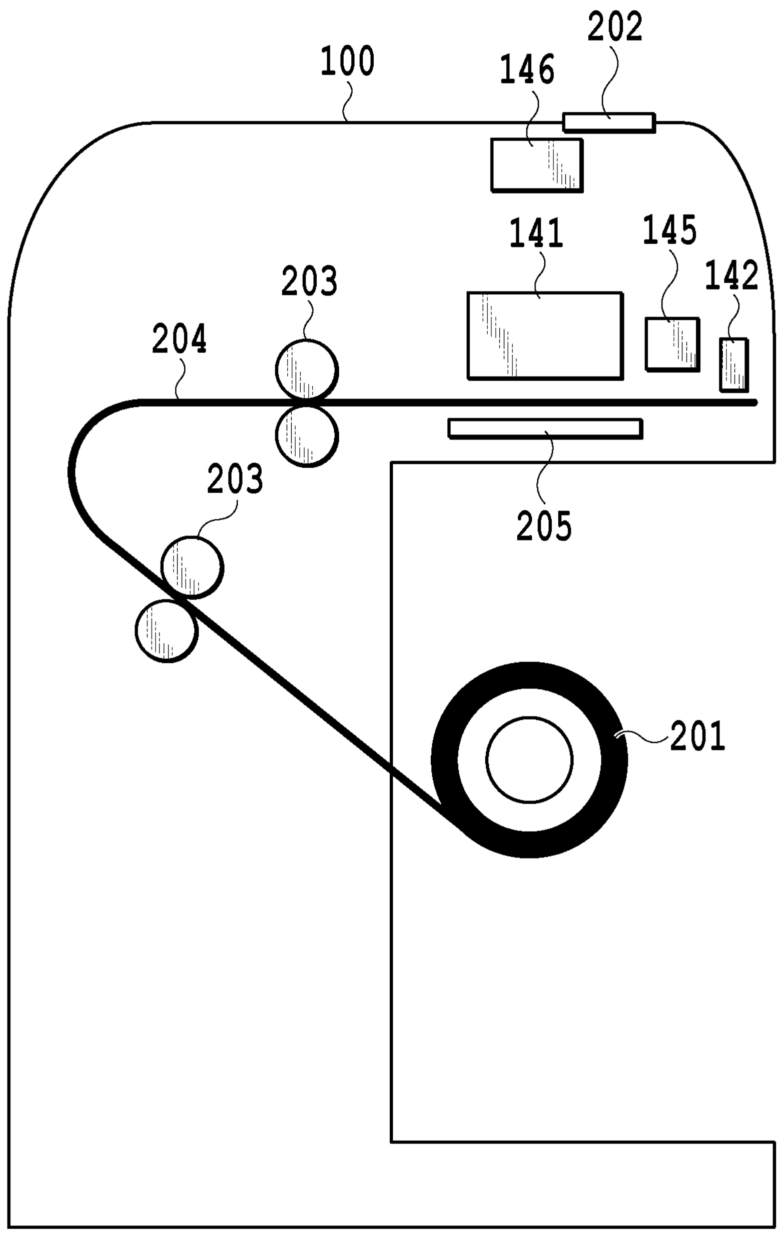
FIG. 2 is a cross-sectional view of an example of a configuration of the printing control apparatus.

FIG. 2 is a cross-sectional view illustrating an example of the configuration of the printing control apparatus 100 according to the present embodiment. With reference to FIG. 2, an explanation is hereinafter given about the portion pertaining to the conveyance of the roll sheet, which is the print medium. In FIG. 2, the printing control apparatus 100 includes the roll sheet mounting unit 201, the transmission window 202, the conveyance rollers 203, the roll sheet 204, and the platen 205. Note that the inkjet head 141, the cutter 142, the optical sensor 145, and the internal illumination 146 are as described above, and thus an explanation thereof is omitted. Further, in the explanations of the drawings that follow, explanations of the aforementioned configurations are similarly omitted. The printing control apparatus 100 according to the present embodiment may be equipped with multiple roll sheet mounting units, where different roll sheets can be installed, respectively. FIG. 2 illustrates the positional relationship of each configuration for conveying the roll sheet 204 inside the printing control apparatus 100. The roll sheet 204 is conveyed by the conveyance rollers 203 along the conveyance path from the roll sheet mounting unit 201. On the roll sheet 204 conveyed from the roll sheet mounting unit 201, printing is performed by the inkjet head 141 ejecting ink. The internal illumination 146 is attached so as to irradiate the area where the inkjet head 141 ejects ink onto the roll sheet 204. The user can observe the condition of the printing through the transmission window 202. During sheet feeding, the printing control apparatus 100 lifts the roll sheet 204 set in the roll sheet mounting unit 201 to a position above the platen 205 with the conveyance rollers 203. On that occasion, the printing control apparatus 100 measures the specular reflected light strength, the diffusion reflected light strength, the roll sheet thickness, and the roll sheet width of the roll sheet 204 with the optical sensor 145. The printed roll sheet is cut to the user's desired length by the cutter 142.

Figure 3:
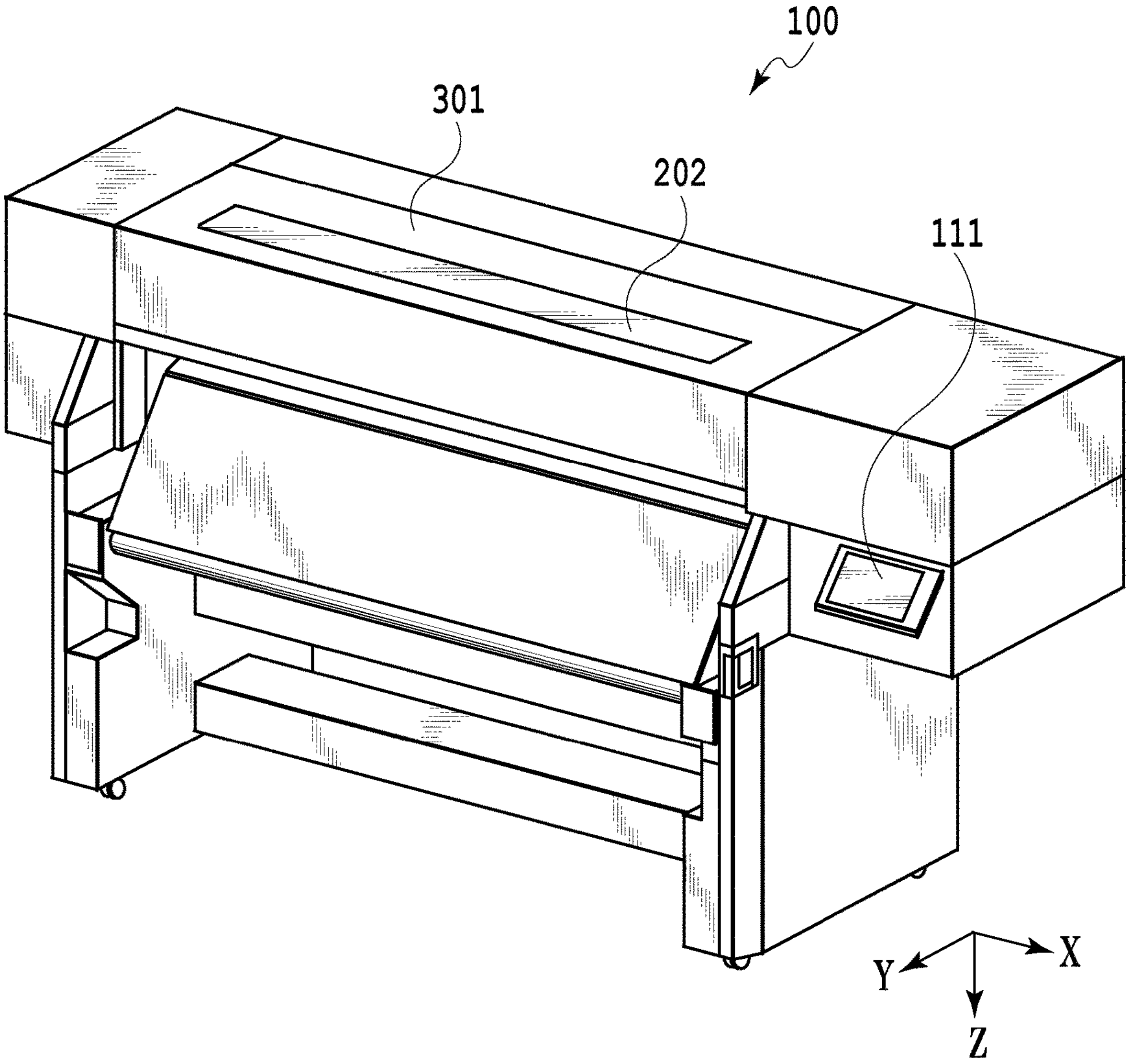
FIG. 3 is a diagram illustrating an example of the outer appearance of the printing control apparatus.

FIG. 3 is a schematic view illustrating an example of the outer appearance of the printing control apparatus 100 according to the present embodiment. With reference to FIG. 3, an explanation is hereinafter given about the cover of the printing control apparatus 100. As illustrated in FIG. 3, the printing control apparatus 100 includes the cover 301 that includes the transmission window 202. The user can observe the platen 205 via the transmission window 202. The internal illumination 146 that irradiates the platen 205 can be operated from the operation panel of the input/output device 111. The internal illumination 146 is not attached to the cover 301 and can irradiate the platen 205 in the same way even in a case where the cover 301 is opened.

Figure 4:
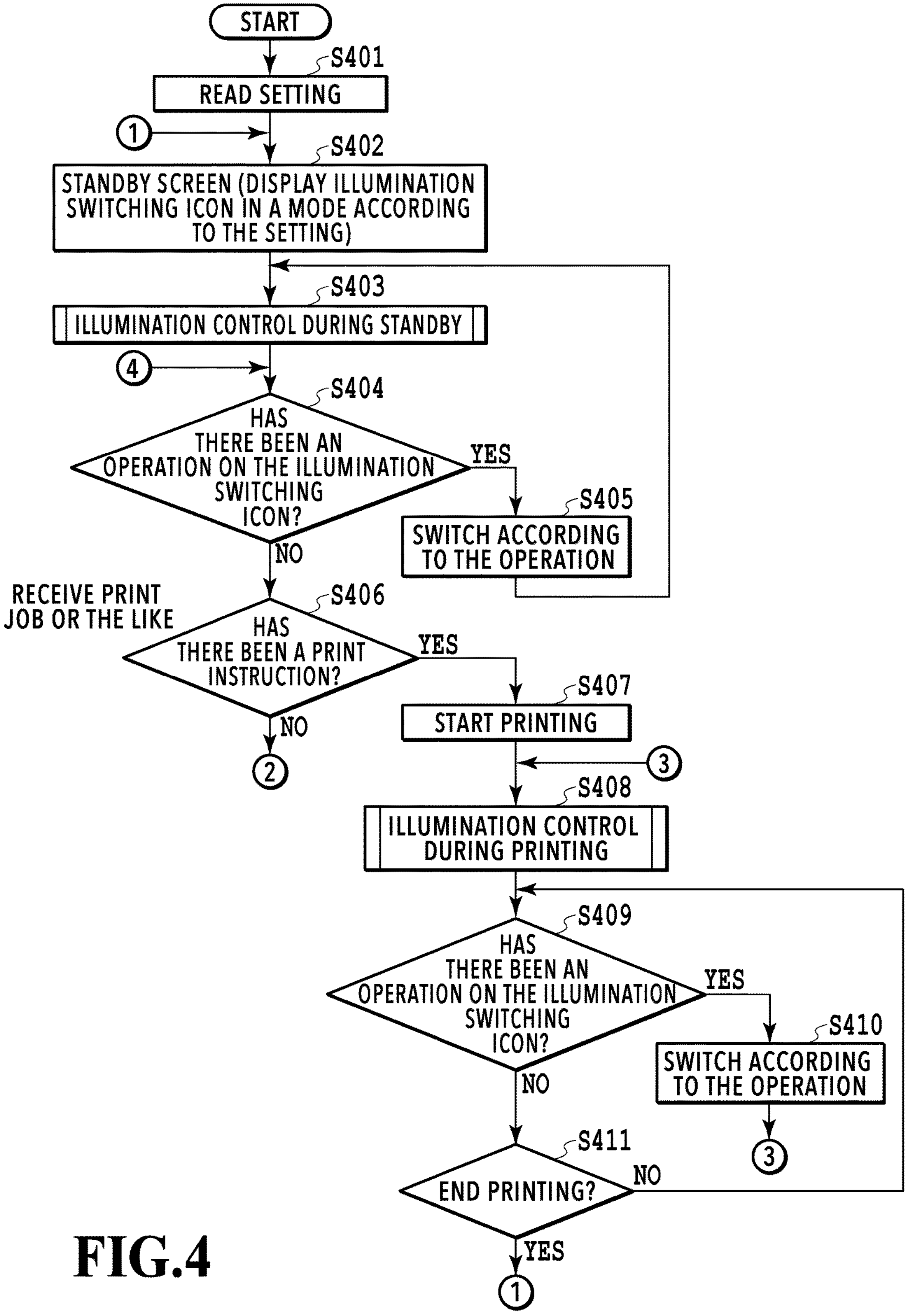
FIG. 4 is a flowchart illustrating an example of the control of the interior illumination in the printing control apparatus.
Figure 5:
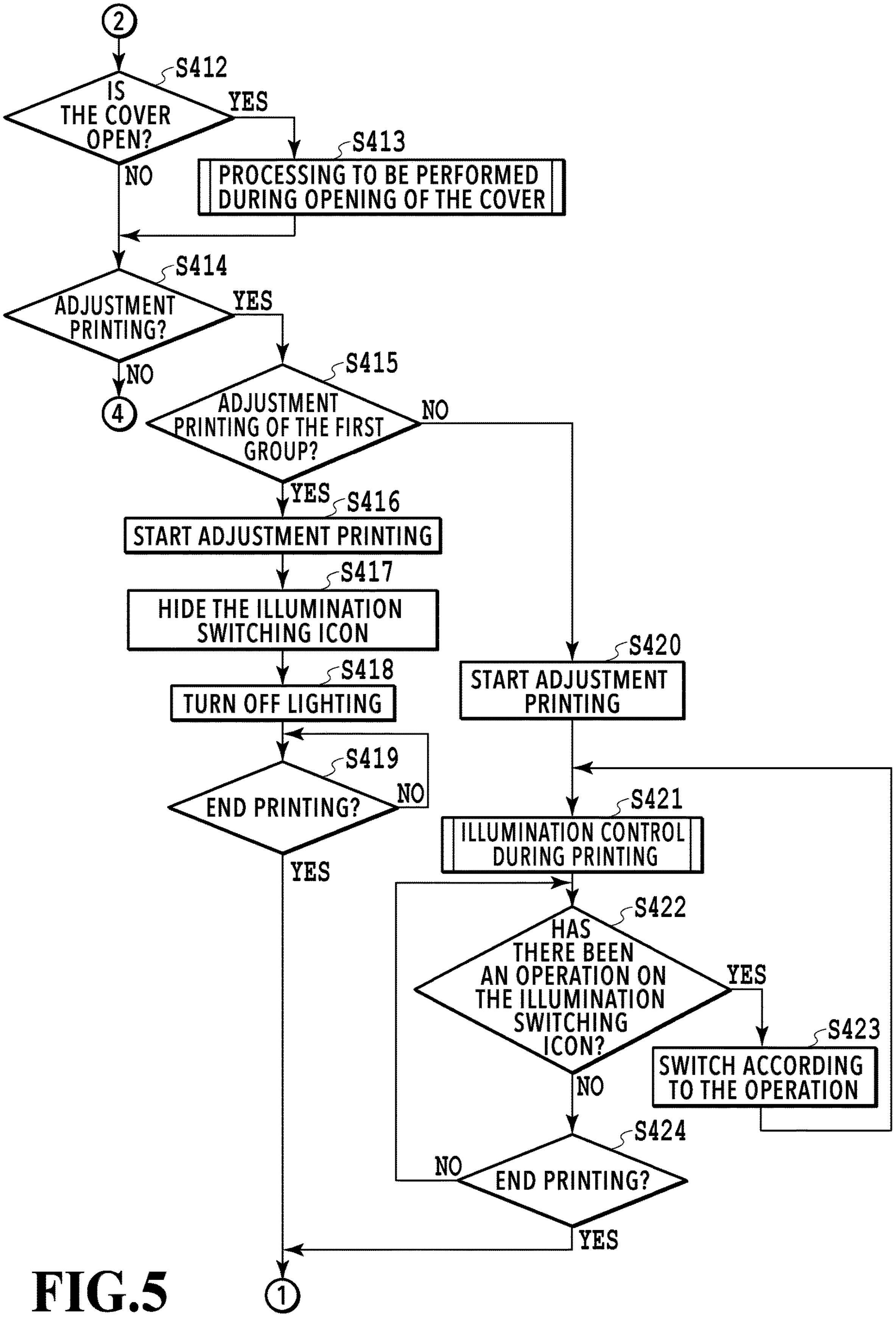
FIG. 5 is a flowchart illustrating an example of the control of the interior illumination in the printing control apparatus.

FIG. 4 and FIG. 5 are flowcharts illustrating an example of the control of the interior illumination of the printing control apparatus 100 of the present embodiment. First, with reference to FIG. 4, an explanation is hereinafter given about the control performed by the printing control apparatus 100 for the lighting state and the lighting off state of the internal illumination 146. Here, the lighting state of the present embodiment indicates the state in which the internal illumination 146 maintains irradiation of light, but there is no limitation as such, and the lighting state includes blinking where the lighting state and the lighting off state are repeated. By the user operation of the input/output device 111, one of three possible illumination settings can be set for the internal illumination 146: the automatic setting (the first setting value), the on setting (the second setting value), and the off setting (the third setting value). The automatic setting is a setting that dynamically switches between the lighting state and the lighting off state of the internal illumination 146 according to the state of the printing control apparatus 100. The processing illustrated in FIG. 4 is implemented by the CPU 128 of the printing control apparatus 100 reading the program stored in the flash ROM 123 into the RAM 124 and executing it. Note that it is also possible that a part or all of the functions in the steps of FIG. 4 are implemented by hardware such as an ASIC or an electronic circuit. The symbol "S" in the description of each process means a step in the flowchart (the same applies to the other flowcharts herein). The processing in FIG. 4 starts after the printing control apparatus 100 is activated.

Figure 6:
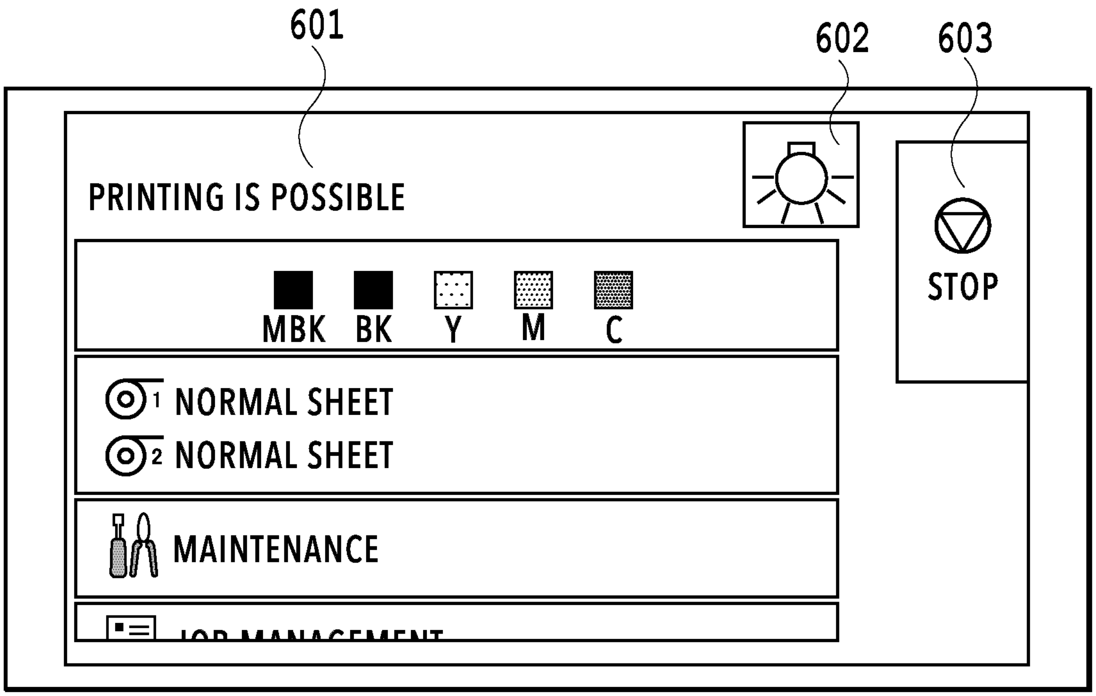
FIG. 6 is a diagram illustrating an example of the screen displayed on the input/output device.
Figure 7:
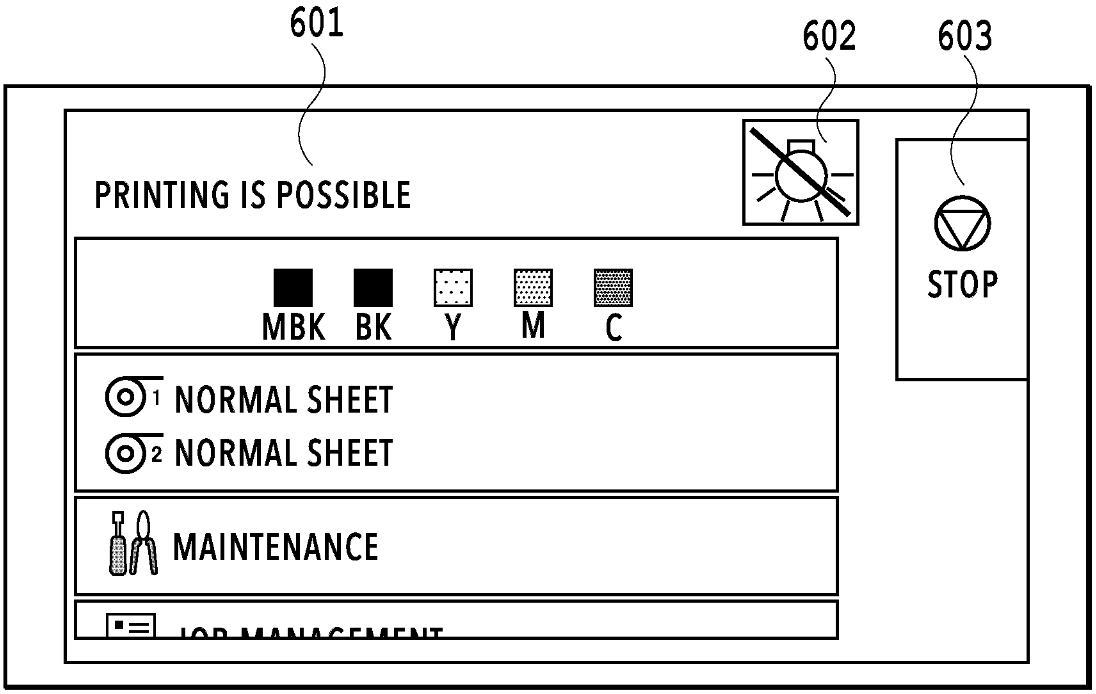
FIG. 7 is a diagram illustrating an example of the screen displayed on the input/output device.

In S401, the CPU 128 reads the illumination setting for the internal illumination 146 from the flash ROM 123. After that, the CPU 128 proceeds to the processing of S402. In S402, the CPU 128 displays on the input/output device 111 a screen including the illumination switching icon 602 according to the setting value read in S401. Specifically, the CPU 128 displays such a screen illustrated in FIG. 6 or FIG. 7 on the input/output device 111. FIG. 6 and FIG. 7 are diagrams illustrating an example of the screen displayed on the input/output device 111 during the standby state of the printing control apparatus 100. With reference to FIG. 6 and FIG. 7, an explanation is hereinafter given about the display of the illumination switching icon 602. The display screen in FIG. 6 includes the banner display component 601, the illumination switching icon 602, and the stop button 603. The banner display component 601 displays the state of the printing control apparatus 100, such as the current printing status of the printing control apparatus 100 and a warning in a case where the ink remaining amount is low. The illumination switching icon 602 is a display item that accepts changes to the illumination setting of the internal illumination 146 through the user operation of the input/output device 111. Further, the illumination switching icon 602 in FIG. 6 is displayed in a case where the illumination setting of the internal illumination 146 is set to the on setting. Note that, if the user operates the illumination switching icon 602 displayed on the input/output device 111, the display format changes, as illustrated in FIG. 7. The illumination switching icon 602 in FIG. 7 is displayed in a case where the illumination setting for the internal illumination 146 is set to the off setting. In other words, in a case where the illumination switching icon 602 in FIG. 7 is displayed, the internal illumination 146 is in the lighting off state. On the other hand, in a case where the illumination switching icon 602 in FIG. 6 is displayed, the internal illumination 146 is in the lighting state in the standby state. The stop button 603 is a soft key for canceling a job, and if pressed during printing, cancellation of the printing being executed is accepted. Instead of being a soft key, the stop button 603 may be mounted as a hard key on the operation panel. Returning to FIG. 4, the CPU 128 then proceeds to the processing of S403.

In S403, the CPU 128 performs the later-described processing to be performed for illumination control during standby, so as to control the lighting state or lighting off state of the internal illumination 146 according to the illumination setting. After that, the CPU 128 proceeds to the processing of S404. In S404, the CPU 128 determines whether or not the illumination setting has been switched by an operation of the input/output device 111 by the user. Specifically, the CPU 128 determines whether or not the illumination switching icon 602 has been operated by the user. If the CPU 128 determines that the illumination switching icon 602 has been operated (YES), the processing proceeds to S405, and if not (NO), the processing proceeds to S406. In S405, the CPU 128 switches the illumination setting according to the user operation in S404. In other words, in a case where there is a user operation on the illumination switching icon 602, the CPU 128 stores the changed new setting value in the flash ROM 123 to change the illumination setting of the internal illumination 146. Further, the CPU 128 switches the illumination switching icon 602. Specifically, the CPU 128 switches the illumination switching icon 602 in FIG. 6 to that in FIG. 7 in a case where, for example, the illumination setting is switched from the on setting to the off setting. After that, the CPU 128 proceeds to the processing of S403. In S406, the CPU 128 determines whether or not a print job or other print instruction has been accepted. If the CPU 128 determines that a print instruction has been accepted (YES), the processing proceeds to S407, and if not (NO), the processing proceeds to the later-described S412.

Figure 8:
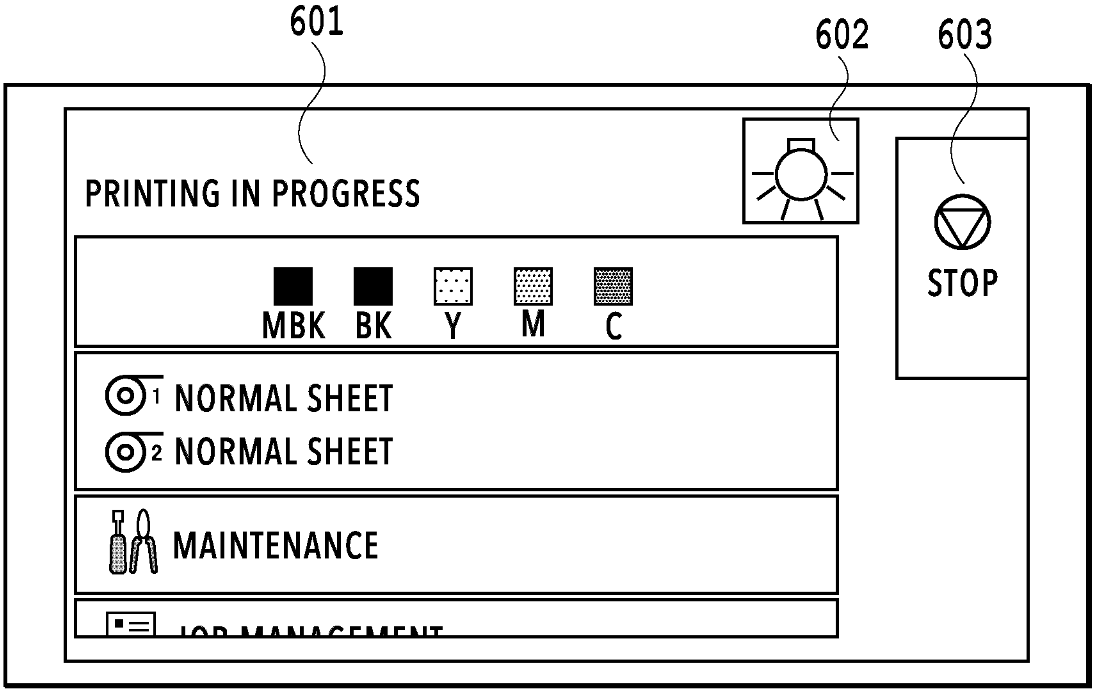
FIG. 8 is a diagram illustrating an example of the screen displayed on the input/output device.

In S407, the CPU 128 starts printing. After that, the CPU 128 proceeds to the processing of S408. In S408, the CPU 128 performs the later-described processing to be performed for illumination control during printing. After that, the CPU 128 proceeds to the processing of S409. In S409, the CPU 128 determines whether or not the illumination switching icon 602 has been operated. If the CPU 128 determines that the illumination switching icon 602 has been operated (YES), the processing proceeds to S410, and if not (NO), the processing proceeds to S411. In S410, the CPU 128 switches the illumination setting according to the user operation in S409. Specifically, in a case where there is a user operation on the illumination switching icon 602, the CPU 128 stores the changed new setting value in the flash ROM 123 to change the illumination setting of the internal illumination 146. Further, in a case where the illumination setting is changed, the CPU 128 also switches the display form of the illumination switching icon 602 displayed on the input/output device 111 according to the illumination setting. For example, in a case where the illumination switching icon 602 is operated during printing and the illumination setting is switched to the on setting, the CPU 128 displays the display screen in FIG. 8 on the input/output device 111. FIG. 8 is a diagram illustrating an example of the screen displayed on the input/output device 111 during printing. In FIG. 8, unlike FIG. 6 and FIG. 7, a message indicating that printing is in progress is displayed on the banner display component 601. Further, the illumination switching icon 602 is displayed with a symbol indicating that the illumination setting is the on setting, as in FIG. 6. After that, the CPU 128 proceeds to the processing of S408. In S411, the CPU 128 determines whether or not the printing has been completed. In a case where the CPU 128 determines that the printing has been completed (YES), the processing proceeds to S402, and if not (NO), the processing proceeds to S409. In other words, the CPU 128 continues the processing of S411 until the printing is completed.

Next, with reference to FIG. 5, in S412, the CPU 128 determines whether or not a cover opened notification, which occurs in a case where the user opens the cover 301, has been received. Specifically, a sensor (not illustrated in the drawings) attached to the cover 301 to detect the opening and closing of the cover, such as a solenoid sensor, detects the opening and closing of the cover and notifies the printer controller 120. In a case where the CPU 128 determines that the cover opened notification has been received (YES), the processing proceeds to S413, and if not (NO), the processing proceeds to S414. In S413, the CPU 128 performs the later-described processing to be performed during opening of the cover. After that, the CPU 128 proceeds to the processing of S414.

In S414, the CPU 128 determines whether or not an adjustment printing instruction has been received. Specifically, the CPU 128 determines whether or not a print instruction for the purpose of adjusting the printing control apparatus 100, such as an automatic registration adjustment printing for adjustment of the head position and a nozzle check pattern printing to check for nozzle clogging, has been received. The automatic registration adjustment is automatic adjustment for registration. In a case where the CPU 128 determines that an adjustment printing instruction has been received (YES), the processing proceeds to S415, and if not (NO), the processing proceeds to S404. In S415, the CPU 128 determines whether or not the contents of the adjustment printing instruction received in S414 are an adjustment printing of the first group. Specifically, the CPU 128 determines whether or not the adjustment printing is an adjustment printing of the first group where the optical sensor 145 performs measurement of the strength of the specular reflected light and/or the diffusion reflected light. In a case where the CPU 128 determines that the adjustment printing is an adjustment printing of the first group (YES), the processing proceeds to S416, and if not (NO), the processing proceeds to S420. In S416, the CPU 128 starts the adjustment printing of the first group determined in S415. After that, the CPU 128 proceeds to the processing of S417.

Figure 9:
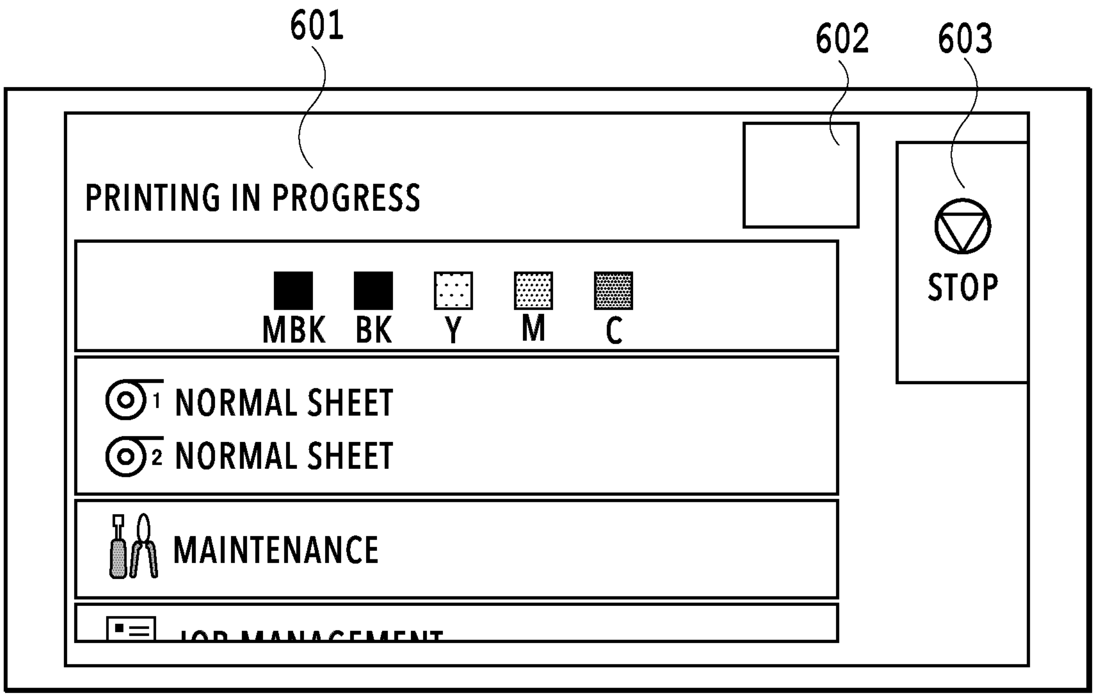
FIG. 9 is a diagram illustrating an example of the screen displayed on the input/output device.

In S417, the CPU 128 hides the illumination switching icon 602. Specifically, the CPU 128 hides the illumination switching icon 602 so as not to be observable and not operable by the user, as illustrated in FIG. 9. Thus, in a case where the adjustment printing is of the first group, the illumination switching icon 602 displayed on the input/output device 111 is hidden and inoperable by the user, because there is a possibility that the light from the internal illumination may affect the measurement result by the optical sensor. The adjustment printing of the first group includes automatic registration adjustment printing and printing of adjustment patterns to set calibration adjustment values to correct for variation of the tint due to the individual difference and secular change of the printing control apparatus 100. The adjustment printing of the first group includes color calibration where a reading is performed, printing of adjustment patterns to fine-tune the feed rate of the sheet, band adjustment where a reading is performed, and the like. After that, the CPU 128 proceeds to the processing of S418.

In S418, the CPU 128 controls the internal illumination 146 so as to turn off the lighting. After that, the CPU 128 proceeds to the processing of S419. In S419, the CPU 128 determines whether or not printing has been completed. In a case where the CPU 128 determines that the printing has been completed (YES), the processing proceeds to S402, and if not (NO), the processing proceeds to S419. In other words, the CPU 128 continues the processing of S419 until determining that printing has been completed. Further, while the processing of S419 continues, as described above, the user cannot change the illumination setting of the internal illumination 146. In this way, in a case where there is a possibility of affecting adjustment printing, the CPU 128 can switch the internal illumination 146 to the lighting off state during the adjustment printing, thereby reducing the effect on the adjustment printing.

In S420, the CPU 128 starts the adjustment printing not included in the first group. After that, the CPU 128 proceeds to the processing of S421. The processing from S421 to S424 is similar to that performed from S408 to S411, and thus the explanation thereof is omitted. In a case of adjustment printing not included in the first group, the illumination switching icon 602 can be operated in the same way as in normal printing, and the illumination setting can be changed by operating the icon until the completion of printing is confirmed in S424. Further, in the above-described S415, the CPU 128 may uniformly hide the illumination switching icon 602 and turn off the lighting of the internal illumination 146 regardless of the type of adjustment printing for power saving. As explained with reference to the flowcharts in FIG. 4 and FIG. 5, the CPU 128 controls the display form of the illumination switching icon 602 or changes presence or absence of the display, according to whether or not it is a state where a user operation can be accepted.

Figure 10:
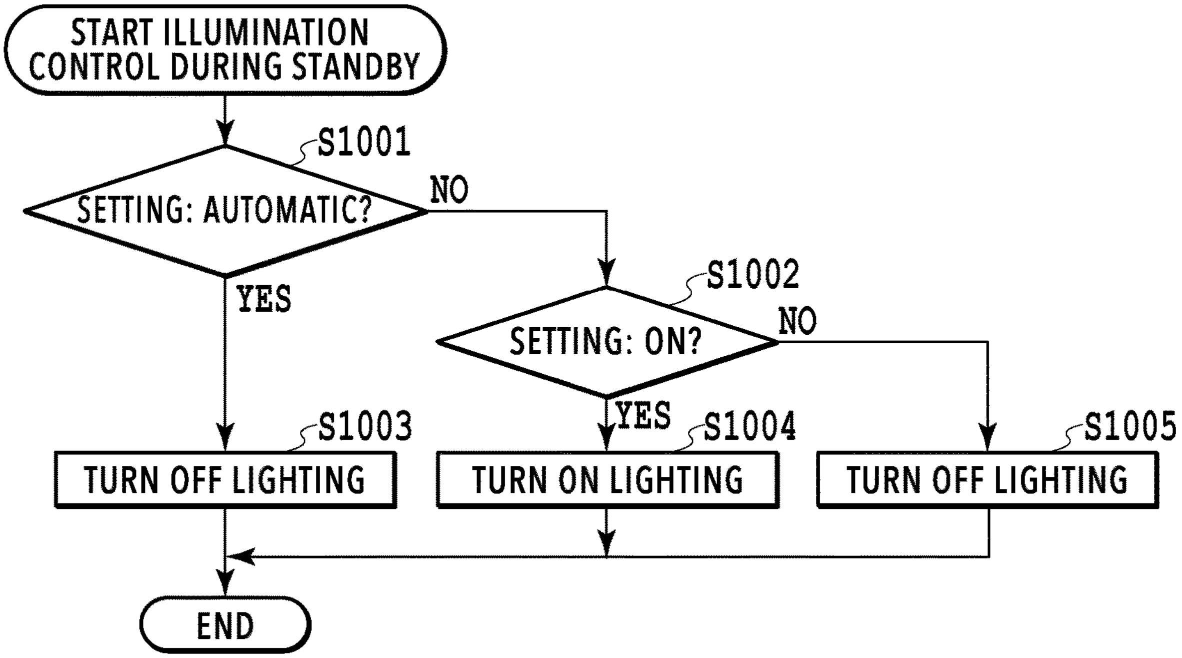
FIG. 10 is a flowchart illustrating an example of the illumination control during standby.

FIG. 10 is a flowchart illustrating an example of the illumination control during standby in FIG. 4 (S403). With reference to FIG. 10, an explanation is hereinafter given of the control for switching the illumination state according to the illumination setting executed by the CPU 128 in the standby state of the printing control apparatus 100. In S1001, the CPU 128 determines whether or not the illumination setting of the internal illumination 146 stored in the flash ROM 123 is the automatic setting. In a case where the CPU 128 determines that the illumination setting is the automatic setting (YES), the processing proceeds to S1003, and if not (NO), the processing proceeds to S1002. In S1003, the CPU 128 switches the internal illumination 146 to the lighting off state and then ends the illumination control during standby. In S1002, the CPU 128 determines whether or not the illumination setting is the on setting. In a case where the CPU 128 determines that the illumination setting is the on setting (YES), the processing proceeds to S1004, and if not (NO), the processing proceeds to S1005. In S1004, the CPU 128 switches the internal illumination 146 to the lighting state and then ends the illumination control during standby. In S1005, CPU 128 switches the internal illumination 146 to the lighting off state and then ends the illumination control during standby.

Figure 11:
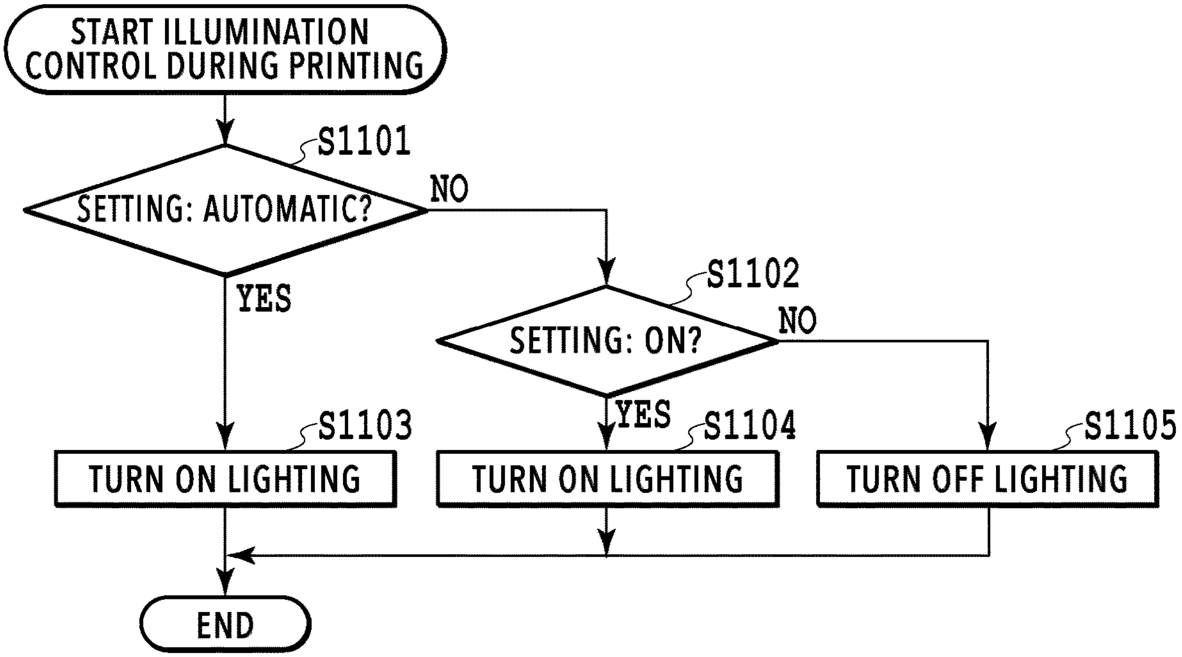
FIG. 11 is a flowchart illustrating an example of the illumination control during printing.

FIG. 11 is a flowchart illustrating an example of the illumination control during printing in FIG. 4 (S408). With reference to FIG. 11, an explanation is hereinafter given of the control for switching the illumination state according to the illumination setting executed by the CPU 128 during printing. In S1101, the CPU 128 determines whether or not the illumination setting of the internal illumination 146 stored in the flash ROM 123 is the automatic setting. In a case where the CPU 128 determines that the illumination setting is the automatic setting (YES), the processing proceeds to S1103, and if not (NO), the processing proceeds to S1102. In S1103, the internal illumination 146 is switched to the lighting state and then the illumination control during printing is ended. In S1102, the CPU 128 determines whether or not the illumination setting is the on setting. In a case where the CPU 128 determines that the illumination setting is the on setting (YES), the processing proceeds to S1104, and if not (NO), the processing proceeds to S1105. In S1104, the CPU 128 switches the internal illumination 146 to the lighting state and then ends the illumination control during printing. In S1105, the CPU 128 switches the internal illumination 146 to the lighting off state and then ends the illumination control during printing.

Figure 12:
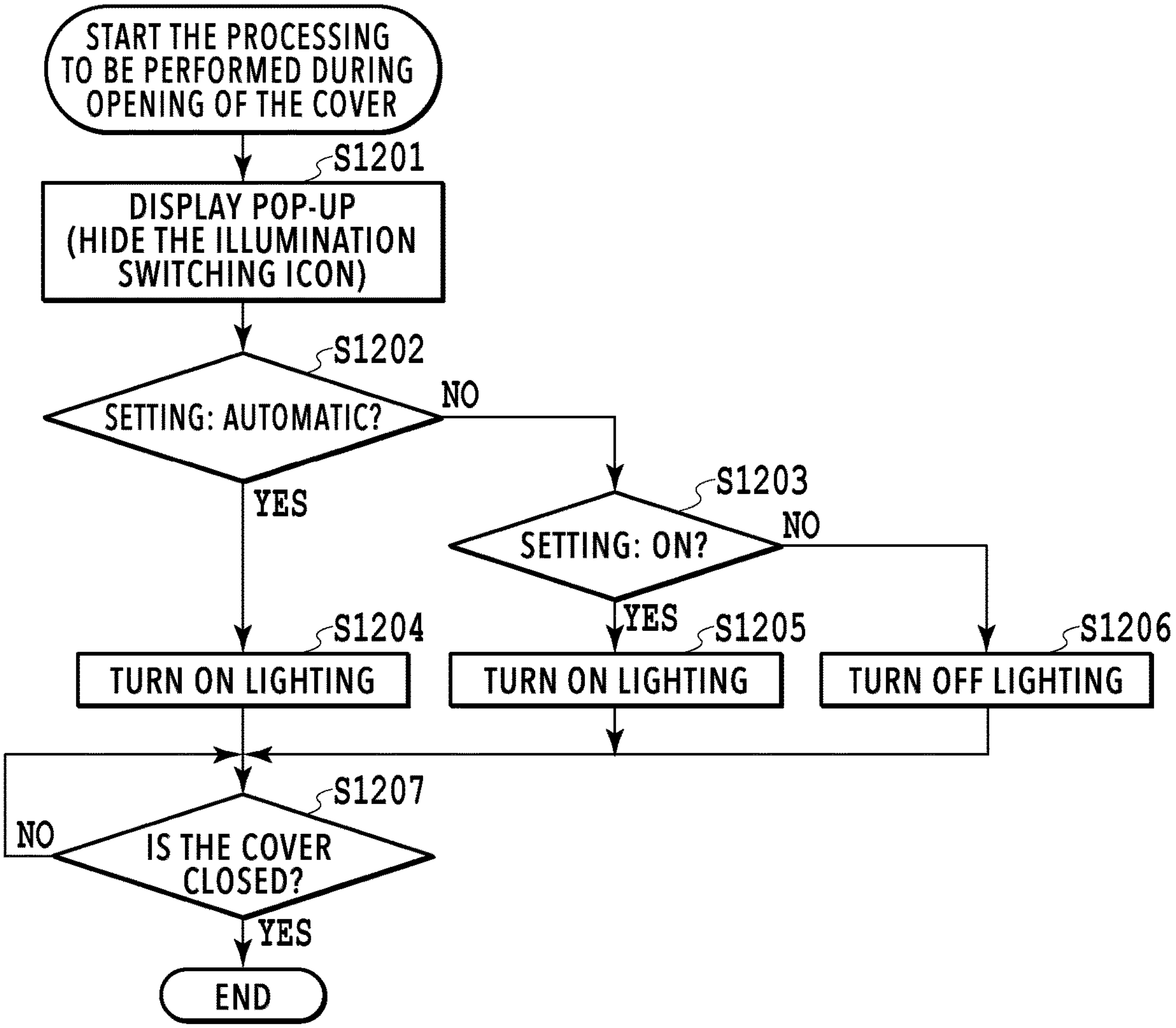
FIG. 12 is a flowchart illustrating an example of the processing to be performed during opening of the cover.
Figure 13:
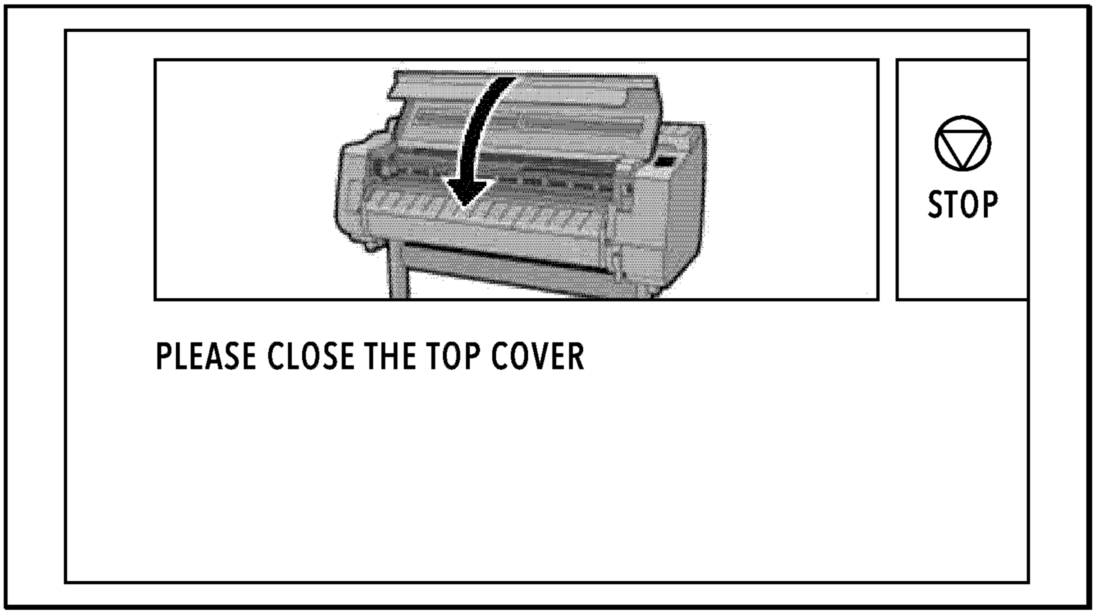
FIG. 13 is a diagram illustrating an example of the screen displayed on the input/output device.

FIG. 12 is a flowchart illustrating an example of the processing to be performed during opening of the cover in FIG. 5 (S413). With reference to FIG. 12, an explanation is hereinafter given of the control for switching the illumination state according to the illumination setting executed by the CPU 128 in a state where the cover 301 is opened. In S1201, the CPU 128 displays a pop-up on the input/output device 111, as illustrated in FIG. 13. FIG. 13 is a diagram illustrating an example of the screen displayed on the input/output device 111 in a case where the cover 301 is opened. In FIG. 13, a message prompting the user to close the cover is displayed, as well as an image of the printing control apparatus. Further, in FIG. 13, the illumination switching icon 602 is not displayed. In other words, in a state where the cover 301 is opened, the CPU 128 hides the illumination switching icon 602 so as to not accept any operation by the user. After that, the CPU 128 proceeds to the processing of S1202. In S1202, the CPU 128 determines whether or not the illumination setting stored in the flash ROM 123 is the automatic setting. In a case where the CPU 128 determines that the illumination setting of the internal illumination 146 is set to the automatic setting (YES), the processing proceeds to S1204, and if not (NO), the processing proceeds to S1203. In S1204, the CPU 128 switches the internal illumination 146 to the lighting state. In this way, the internal illumination 146 is switched to the lighting state in a case where the illumination setting is the automatic setting, in order to assist the user in performing error recovery work. After that, the CPU 128 proceeds to the processing of S1207.

In S1203, the CPU 128 determines whether or not the illumination setting is the on setting. In a case where the CPU 128 determines that the illumination setting is the on setting (YES), the processing proceeds to S1205, and if not (NO), the processing proceeds to S1206. In S1205, the CPU 128 switches the internal illumination 146 to the lighting state. After that, the CPU 128 proceeds to the processing of S1207. In S1206, the CPU 128 switches the internal illumination 146 to the lighting off state. After that, the CPU 128 proceeds to the processing of S1207. In S1207, the CPU 128 determines whether or not the cover 301 is closed. In a case where the CPU 128 determines that the cover 301 is closed (YES), the processing during opening of the cover ends, and if not (NO), the processing proceeds to S1207. In other words, the CPU 128 continues the processing of S1207 until determining that the cover 301 is closed. Note that, in S1201 of FIG. 12, it is explained that the pop-up is displayed and the illumination switching icon 602 is hidden, but there is no limitation as such. In S1201, the CPU 128 may display the illumination switching icon 602 and accept a user operation to switch the illumination setting even in a case where the cover 301 is opened.

FIG. 14 is a diagram illustrating an example of the interior illumination control in an embodiment of the present disclosure. With reference to FIG. 14, an explanation is hereinafter given about the control of the state of the internal illumination 146 in each illumination setting. In the leftmost column in FIG. 14, the three illumination settings of "AUTOMATIC," "ON," and "OFF" are illustrated. Additionally, in each line of the illumination settings, the state of the internal illumination 146 in each state of the printing control apparatus 100 is illustrated. During standby, cover opened, cover closed, during printing, at the completion of printing, during adjustment, after adjustment, and during error are illustrated in the top line of FIG. 14 as the states of the printing control apparatus 100. For example, the "LIGHTING" one square to the right of the illumination setting "ON" indicates that the CPU 128 switches the internal illumination 146 to the lighting state in a case where the illumination setting is set to the on setting while the printing control apparatus 100 is in the standby state. Specifically, the control is illustrated in S1004 of FIG. 10. The printing control apparatus 100 of an embodiment of the present disclosure controls the state of the internal illumination 146 according to its own state and the illumination setting, as illustrated in FIG. 14.

Note that, in the present embodiment, an explanation is given where the printing control apparatus 100 changes the illumination setting according to the operation of the illumination switching icon 602 by the user, but there is no limitation as such. For example, the CPU 128 may receive an instruction that includes information relating to the illumination setting from an external device such as the host computer 150 via the host I/F 127, and change the illumination setting according to the instruction. After that, the CPU 128 may control the state of the internal illumination

146 as illustrated in FIG. 10 through FIG. 12 according to the state of the printing control apparatus 100 and the illumination setting. Note that, in the flowchart of FIG. 5, the configuration enters into the processing to be performed during opening of the cover in the standby state, and there is no flow to enter into the processing to be performed during opening of the cover with the cover opened notification during printing or during adjustment. However, there is no limitation as such under certain circumstances (for example, an error state of the printing control apparatus 100 due to a paper jam, or the like). In other words, in certain circumstances, the CPU 128 performs the processing to be performed during opening of the cover similar to a case where the cover 301 is opened. However, the error display that is displayed in a case where the cover 301 is forcibly opened while the cover is locked, or the like, shall be prioritized. Further, during the execution of each process of FIG. 4, FIG. 5, and FIG. 10 through FIG. 12, the occurrence of an error that requires the printing control apparatus to be powered off for error recovery or an error that requires recovery processing by a service staff is conceivable. In such a case, the CPU 128 controls the internal illumination 146 to turn off the lighting regardless of the state of the printing control apparatus 100. The reason for this control is to avoid leaving the interior illumination on unnecessarily, since whether the user is in a location where it is possible to operate the printing control apparatus during the occurrence of the error is unknowable. Further, regarding errors that can be recovered by a user operation, such as a no ink warning and a paper jam, the CPU 128 performs illumination control based on the control of each flowchart illustrated in the accompanying drawings. Further, at the time of switching the illumination state, in a case where the CPU 128 determines that the previous illumination setting is the same as the illumination setting to be switched to, the CPU 128 does not perform switching of the illumination state of the internal illumination 146. Furthermore, in addition to the illumination switching icon 602, the input/output device 111 may also display a temporary lighting icon to temporarily switch the internal illumination 146 to the lighting state. In a case where the temporary lighting icon is pressed, the CPU 128 controls the internal illumination 146 to be in the lighting state without changing the illumination setting in the temporary lighting state. After a predetermined time period has elapsed, the CPU 128 releases the temporary lighting state of the internal illumination 146 and returns to the lighting state according to the original illumination setting. Further, the printing control apparatus 100 may also be configured to have at least two of the three illumination settings of the automatic setting, the on setting, and the off setting. Note that the above-described various controls explained as performed by the CPU 128 may be performed by a single piece of hardware, or multiple pieces of hardware (for example, multiple processors and circuits, or the like) may share the processing to perform control of the entire apparatus.

Further, although the present disclosure has been described in detail based on preferable embodiments thereof, the present disclosure is not limited to these specific embodiments, and, various forms are also included in the present disclosure to the extent of not departing from the gist of the present disclosure. Moreover, each of the above-described embodiments merely illustrates one embodiment of the present disclosure, and it is also possible to appropriately combine each of the embodiments.

The present disclosure is also implemented by executing the following processing. In other words, software (a program) that implements the functions of the above-described embodiments is supplied to the system or apparatus via a network or various storage media. Then, at least one computer (or at least one CPU, MPU, or the like) in the system or apparatus reads and executes the program code in that processing. In this case, the program and the storage medium storing the program constitute the present disclosure.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present disclosure, during printing, illumination irradiating the printing area can be controlled according to instructions from the user.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-126829, filed Aug. 3, 2023, which is hereby incorporated by reference herein in its entirety.

What is claimed is:

1. A printing control apparatus comprising:

an illumination configured to irradiate light on an area where a print head performs printing onto a print medium;

at least one memory and at least one processor which function as:

a control unit configured to control switching of the illumination between a lighting state and a lighting off state according to a particular user operation performed on a particular display item during printing performed by the print head; and a display control unit configured to perform control to display the particular display item in a state where the particular user operation can be accepted during the printing, wherein the display control unit performs control to change the display form or the presence or absence of the display of the particular display item according to whether or not it is a state where the particular user operation can be accepted.

2. The printing control apparatus according to claim 1, wherein the control unit does not accept the particular user operation in a case of an error state.

3. The printing control apparatus according to claim 1, further comprising a setting unit configured to be able to set one of at least two of the following setting values: a first setting value for dynamically switching the illumination between lighting and lighting off according to a state of the printing control apparatus, a second setting value for causing the illumination to turn on the lighting, and a third setting value for causing the illumination to turn off the lighting.

4. The printing control apparatus according to claim 3, wherein the control unit performs control for changing a setting of the setting unit during the printing according to the particular user operation.

5. The printing control apparatus according to claim 3, wherein the setting values that can be set by the setting unit include the first through the third setting values.

6. The printing control apparatus according to claim 3, wherein the control unit controls the illumination to temporarily turn on the lighting during the printing according to the particular user operation without changing the setting value set by the setting unit.

7. The printing control apparatus according to claim 3, wherein the control unit controls the switching of the illumination between the lighting state and the lighting off state during the printing according to an instruction from an external apparatus to change the setting value set by the setting unit.

8. A printing control apparatus comprising:

an illuminator configured to irradiate light on an area where a print head performs printing onto a print medium; and at least one memory and at least one processor which function as:

a control unit configured to control switching of the illuminator between a lighting state and a lighting off state according to a particular user operation during printing performed by the print head, wherein the control unit does not accept the particular user operation even during the printing in a case where the printing is an adjustment printing where a pattern for adjustment related to printing is printed.

9. The printing control apparatus according to claim 8, wherein the particular user operation is an operation performed on a particular display item, and wherein the printing control apparatus further comprises a display control unit configured to perform control for displaying the particular display item in a state where the particular user operation can be accepted during the printing.

10. The printing control apparatus according to claim 9, wherein the display control unit is configured to perform control for changing the display form or the presence or absence of the display of the particular display item according to whether or not it is a state where the particular user operation can be accepted.

11. The printing control apparatus according to claim 8, wherein the control unit controls the illumination to turn off the lighting during the printing of the adjustment printing.

12. A control method for a printing control apparatus including an illumination configured to irradiate light on an area where a print head performs printing onto a print medium, the control method comprising:

controlling switching of the illumination between a lighting state and a lighting off state according to a particular user operation performed on a particular display item during printing performed by the print head; and performing control to display the particular display item in a state where the particular user operation can be accepted during the printing, wherein in performing, control is performed to change the display form or the presence or absence of the display of the particular display item according to whether or not it is a state where the particular user operation can be accepted.

13. A non-transitory computer-readable storage medium storing a program for causing a computer to perform:

irradiating light with an illumination on an area where a print head performs printing onto a print medium, and controlling switching of the illumination between a lighting state and a lighting off state according to a particular user operation performed on a particular display item during printing performed by the print head; and performing control to display the particular display item in a state where the particular user operation can be accepted during the printing, wherein in performing, control is performed to change the display form or the presence or absence of the display of the particular display item according to whether or not it is a state where the particular user operation can be accepted.

14. A control method for a printing control apparatus including an illumination configured to irradiate light on an area where a print head performs printing onto a print medium, the control method comprising:

controlling switching of the illumination between a lighting state and a lighting off state according to a particular user operation during printing performed by the print head; and wherein in the controlling, the particular user operation is not accepted even during the printing in a case where the printing is an adjustment printing where a pattern for adjustment related to printing is printed.

15. A non-transitory computer-readable storage medium storing a program for causing a computer to perform:

irradiating light with an illumination on an area where a print head performs printing onto a print medium, and controlling switching of the illumination between a lighting state and a lighting off state according to a particular user operation during printing performed by the print head; and wherein in the controlling, the particular user operation is not accepted even during the printing in a case where the printing is an adjustment printing where a pattern for adjustment related to printing is printed.

* * * * *